US009411970B2

(12) United States Patent
Saroiu et al.

(10) Patent No.: US 9,411,970 B2
(45) Date of Patent: Aug. 9, 2016

(54) SEALING SECRET DATA WITH A POLICY THAT INCLUDES A SENSOR-BASED CONSTRAINT

(75) Inventors: Stefan Saroiu, Redmond, WA (US); Alastair Wolman, Seattle, WA (US); Himanshu Raj, Issaquah, WA (US); He Liu, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/213,085

(22) Filed: Aug. 19, 2011

(65) Prior Publication Data

US 2013/0047197 A1 Feb. 21, 2013

(51) Int. Cl.
| | | |
|---|---|---|
| G06F 21/00 | (2013.01) | |
| G06F 21/62 | (2013.01) | |
| H04L 29/06 | (2006.01) | |

(52) U.S. Cl.
CPC .... *G06F 21/6209* (2013.01); *G06F 2221/2111* (2013.01); *H04L 63/08* (2013.01); *H04L 63/102* (2013.01)

(58) Field of Classification Search
CPC .... H04L 63/08; H04L 63/102; H06F 21/6218
USPC ............................. 726/1, 2, 4, 27; 380/258
See application file for complete search history.

(56) References Cited

U.S. PATENT DOCUMENTS

| 6,457,129 B2 * | 9/2002 | O'Mahony ...................... 726/4 |
| 7,051,196 B2 * | 5/2006 | Angelo et al. .................... 713/1 |
| 7,143,289 B2 * | 11/2006 | Denning et al. ............... 713/168 |
| 8,127,168 B2 * | 2/2012 | Maeda et al. .................. 713/330 |
| 8,190,778 B2 * | 5/2012 | Shanbhogue ................... 709/250 |
| 2002/0154777 A1 * | 10/2002 | Candelore ...................... 380/258 |
| 2002/0177449 A1 * | 11/2002 | McDonnell et al. ........... 455/456 |
| 2003/0093680 A1 * | 5/2003 | Astley et al. ................... 713/183 |
| 2003/0210783 A1 * | 11/2003 | Filippi ............................ 380/44 |
| 2005/0080848 A1 * | 4/2005 | Shah ............................... 709/204 |
| 2006/0112418 A1 * | 5/2006 | Bantz et al. ....................... 726/4 |
| 2007/0101438 A1 * | 5/2007 | Govindarajan ................. 726/27 |
| 2008/0222309 A1 * | 9/2008 | Shanbhogue .................. 709/250 |
| 2010/0229168 A1 * | 9/2010 | Maeda et al. ...................... 718/1 |
| 2012/0222114 A1 * | 8/2012 | Shanbhogue .................... 726/22 |

OTHER PUBLICATIONS

Yang, et al., "Toward Resilient Security in Wireless Sensor Networks", Retrieved at <<http://www.cs.ucla.edu/wing/publication/papers/Yang.MOBIHOC05.ps>>, Proceedings of the 6th ACM international symposium on Mobile ad hoc networking and computing, May 25-28, 2005, pp. 1-12.

(Continued)

*Primary Examiner* — Saleh Najjar
*Assistant Examiner* — Peiliang Pan
(74) *Attorney, Agent, or Firm* — Alin Corie; Sandy Swain; Micky Minhas

(57) ABSTRACT

Technologies pertaining to limiting access to secret data through utilization of sensor-based constraints are described herein. A sensor-based constraint is a constraint that can only be satisfied by predefined readings that may be output by at least one sensor on a mobile computing device. If the sensor on the mobile computing device outputs a reading that satisfies the sensor-based constraint, secret data is provided to a requesting application. Otherwise, the requesting application is prevented from accessing the secret data.

20 Claims, 7 Drawing Sheets

(56) References Cited

OTHER PUBLICATIONS

Ardagna, et al., "Supporting Location Based Conditions in Access Control Policies", Retrieved at <<http://spdp.dti.unimi.it/papers/asiaccs06.pdf>>, Proceedings of the 2006 ACM Symposium on Information, computer and communications security, ASIACCS' 06, Mar. 21-23, 2006, pp. 1-11.

Ray, et al., "Short Paper: Towards a Location-Aware Role-Based Access Control Model", Retrieved at <<http://ieeexplore.ieee.org/stamp/stamp.jsp?tp=&arnumber=1607578>>, First International Conference on Security and Privacy for Emerging Areas in Communications Networks, Computer Society, Sep. 5-9, 2005, pp. 1-3.

"Trusted Sensors", U.S. Appl. No. 12/823,150, filed Jun. 25, 2010, pp. 35.

"Protection of Virtual Machines Executing on a Host Device", U.S. Appl. No. 12/815,415, filed Jun. 15, 2010, pp. 22.

* cited by examiner

SEALING SECRET DATA WITH A POLICY THAT INCLUDES A SENSOR-BASED CONSTRAINT

BACKGROUND

A factor contributing to the rapid proliferation of smart phones and other mobile computing devices is the incorporation of sensors into these devices. Specifically, mobile computing devices can be equipped with many different types of sensors, including, but not limited to, a geolocation sensor (e.g. a global positioning system (GPS) sensor), a camera, a microphone, a velocity sensor, an accelerometer, a proximity sensor, combinations thereof, and so on. The incorporation of such sensors into mobile computing devices has contributed to a rise in a number of applications that perform a service based at least in part upon readings from such sensors. In an example, a mapping application can receive a current location of a user (from a geolocation sensor in a mobile computing device of the user that outputs location data) and can present the user with a map of a region immediately surrounding such user, as well as driving directions to different locations, based upon the data from the geolocation sensor.

In conventional implementations of mobile computing devices there is little, if any, mechanism in place that authenticates that data output by sensors on mobile computing devices are authentic, and have not been subject to modification by a user or software executing on the mobile computing device. Pursuant to an example, an application executing on the mobile computing device may call an application programming interface (API) that is configured to enable retrieval of a sensor reading from a GPS sensor on the mobile computing device. The application, the user, or other malicious software can modify a value output by the GPS sensor, such that the value consumed by an application or a cloud service is inaccurate.

Conventionally there has been little, if any, concern regarding the lack of trustworthiness of sensor readings in mobile computing devices, as typically a user or software program has no reason to modify values output by a sensor on a mobile computing device. Continuing with the mapping application example set forth above, a user has no reason to attempt to deceive a mapping application about her true location, as doing so only prevents the user from receiving optimal services provided by a mapping cloud service. That is, if the user wishes to receive directions from a current location to an intended destination, the user has no incentive to modify a value output by a GPS sensor to mask her true location.

SUMMARY

The following is a brief summary of subject matter that is described in greater detail herein. This summary is not intended to be limiting as to the scope of the claims.

Described herein are various technologies pertaining to sealing secret data with a policy that includes a sensor-based constraint, wherein the sensor-based constraint prevents unsealing of the data unless a sensor on a mobile-computing device outputs a reading that satisfies the constraint. Also described herein are various technologies pertaining to unsealing the secret data from the policy based at least in part upon a reading output from the sensor on the computing device.

A class of computer executable applications that are executed on computing devices that comprise at least one sensor may desirably limit access secret data unless a sensor-based constraint is satisfied. In an example, a laptop computing device may have a drive thereon that is desirably inaccessible (e.g., unable to be mounted) when a user of the laptop is not at a particular location (a location of the employer of the user of the laptop). To access the drive, the user may desirably retrieve a secret key or password that is inaccessible to the user unless the user is within a particular geographic region. When the user requests access to the drive, a geolocation sensor on the laptop can be called to generate a sensor reading. If, and only if, the sensor reading is a value that is within the predefined geographic range will the user be provided with the secret key or password that the drive to be mounted. If the value of the sensor reading from the geolocation sensor is outside the geographic region, then the secret key is not output, and the user is prevented from accessing the drive. Other exemplary applications that restrict access to secret data based upon a sensor-based constraint in a policy are set forth herein.

In an exemplary embodiment, a sensor-based constraint can be enforced through sealing and unsealing operations. A seal operation facilitates protecting secret data (e.g., a password or secret key) by generating ciphertext that is cryptographically secure against attacks, and can be decrypted by satisfying one or more constraints of a policy. An unseal operation facilitates decrypting the ciphertext and outputting the secret data if the one or more constraints of the policy have been satisfied. In the exemplary embodiments described herein, the policy includes a sensor-based constraint, such that the secret data can be unsealed from the policy if and only if a reading from at least one sensor satisfies the sensor-based constraint.

In an exemplary embodiment, the seal and unseal operations can be undertaken in a trusted portion of a mobile computing device, such as in secure hardware or software module, through utilization of hardware-assisted security (e.g., a hardware trusted platform module, ARM TrustZone technology, and virtualization support). For example, such a module can be a secure operating system, running either in the SecureWorld in ARM TrustZone enabled system, or in an emancipated virtual machine separated from the root virtual machine that is executing a less secure operating system of a mobile computing device in a virtualized system, etc. Additionally, readings output by sensors can be signed in the trusted portion of the mobile computing device to indicate that the sensor reading is the actual value output by the sensor and has not been modified by a user, an operating system, or malicious software executing on the mobile computing device.

With respect to the seal operation, a computer-executable application can set forth a policy that includes a sensor-based constraint, wherein the secret data is sealed with the policy (e.g., undecipherable) until the sensor-based constraint is satisfied. This constraint may be, for example, a location constraint, a proximity constraint, a velocity constraint, or the like. The output of the seal operation may be ciphertext that can be decrypted only through use of a sensor reading that satisfies the sensor-based constraint of the policy. In the unseal operation, a computer-executable application, upon initiation from a user, can request access to the secret data by obtaining a reading from a sensor that may satisfy the sensor-based constraint of the policy. If the sensor-based constraint is satisfied, the result of the unseal operation is return of the secret data to the application that requests such data.

Other aspects will be appreciated upon reading and understanding the attached figures and description.

DETAILED DESCRIPTION

Figure 1:
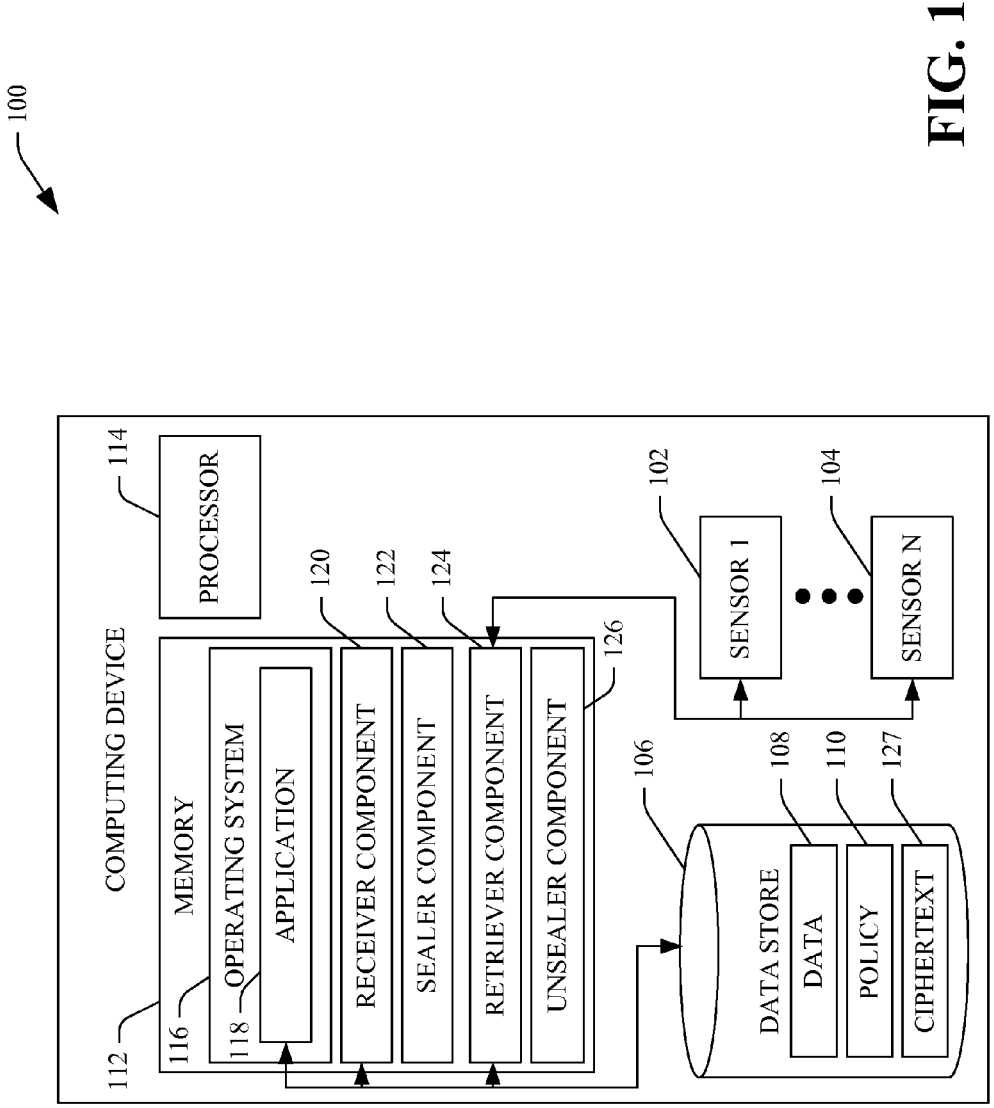
FIG. 1 is a functional block diagram of an exemplary system that facilitates sealing and unsealing secret data to and from a policy that includes a sensor-based constraint.

Various technologies pertaining to restricting access to secret data unless and until a sensor-based constraint is satisfied will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Furthermore, the terms "component" and "system" are configured to encompass hardware that is configured to perform specified tasks, such as field programmable gate arrays (FPGAs).

With reference now to FIG. 1, an exemplary computing device 100 that is configured to seal and unseal secret data to and from a policy, wherein the policy includes a sensor-based constraint that is tied to at least one sensor on the computing device 100, is illustrated. The computing device 100 may be, in an exemplary embodiment, a mobile computing device, such as, but not limited to, a laptop computing device, a tablet computing device, netbook, a mobile media player, a mobile telephone, a digital camera, a digital video camera, or other suitable mobile computing device. The computing device 100 comprises a plurality of sensors 102-104. The sensors 102-104 may be any suitable type of sensor that can be included in a mobile computing device, such as, but not limited to, a geolocation sensor (such as a GPS sensor), a proximity sensor that indicates a proximity of the computing device 100 to an entity such as a person, a thermometer, a humidity sensor, a velocity sensor, a depth sensor, an accelerometer, a gyroscope, or other suitable sensor. The sensors 102-104 can be configured to output sensor readings responsive to receiving requests for such readings from an operating system executing on the computing device 100 and/or an application executing on the computing device 100.

The computing device 100 further comprises a data store 106, which may be a flash memory drive, a hard drive, a portion of memory, or the like. The data store 106 may comprise secret data 108, wherein, for instance, the secret data 108 may be a password, a cryptographic key, or other suitable data that is desirably kept secret from an application or user unless at least one sensor-based constraint is satisfied. The data store 106 may additionally comprise a policy 110, wherein the policy 110 includes the sensor-based constraint, and generally defines whether a user or application is authorized to access the secret data 108. For example, the policy 110 may desirably restrict access to the secret data 108 only to instances that the computing device 100 is located within a particular geographic region. The policy, then, can be satisfied by a sensor reading output from a geolocation sensor on the computing device 100. In another exemplary embodiment, the policy 110 may include a constraint that restricts access to the secret data 108 to instances that the velocity of the computing device 100 is beneath a threshold. In this example, the policy can be satisfied by a sensor reading output by a velocity sensor on the computing device 100. Various exemplary policies that can be put in place for different types of applications are set forth below for purposes of explanation, but are not intended to be limiting as to the scope of the hereto appended claims. Further, while the examples provided herein pertain to the policy 110 comprising sensor-based constraints, it is to be understood that the policy 110 may include other constraints, such as restricting access to secret data solely to an application executing on the computing device 100.

In an exemplary application, a company may provide its employees with laptop computers. The company, however, may wish to provide access to a certain drive on the laptop computer if, and only if, the laptop computer is located on the premises of the company. Accordingly, the secret data 108 may be a password or key that allows the user to access contents on the aforementioned drive (or allows the drive to be mounted by an operating system), while the policy 110 may include a sensor-based constraint that restricts access to the drive to situations where the computing device 100 is located on the premises of the company (as can be ascertained by a reading from a geolocation sensor).

In another example, the computing device 100 may be a mobile telephone, and it may be desirable to prevent a user of the mobile telephone from using a text messaging application if the mobile telephone is traveling at velocities above a threshold (thereby indicating that the user of the mobile telephone is in an automobile). In such an exemplary embodiment, the secret data 108 may be a key that enables the application to be executed on the computing device 100, thereby allowing the user to send and receive text messages. The policy 110, then, includes a sensor-based constraint that can be satisfied by a reading from a velocity sensor on the computing device 100.

In still yet another example, the computing device 100 may be a mobile computing device and a user thereof, to conserve battery resources and/or to prevent execution of malicious software (malware), may desirably restrict execution of applications to instances where the user is proximate to the mobile telephone. In this example, the secret data 108 may be a key that is presented by an application to an operating system on the computing device 100, wherein the operating system only allows the application to execute if the key is presented. The policy 110 may desirably restrict access to the key to instances when a user is proximate to the mobile computing device, and accordingly the sensor-based constraint of the policy 110 may be satisfied by a reading from a proximity sensor on the computing device 100.

In another example, a web based service, such as a banking service, may desirably restrict access to services to users who are located in a particular geographic region (in a certain country) in an effort to restrict unauthorized access to banking data of a user. Accordingly, the secret data 108 may be a password that is used to obtain access to the banking service, while the policy 110 desirably restricts access to situations where the user is in the specified country. Therefore, the sensor-based constraint of the policy 110 can be satisfied by a reading output by a geolocation sensor on the computing device 100.

In yet another example, a web-based service may provide a user with an ability to reset passwords (e.g., when a user has forgotten a password the password can be reset). The web-based service provider, however, to facilitate prevention of password theft, may desirably restrict the password reset functionality to users that are located in a specified geographic region. Here, the secret data 108 is a key that allows the password reset function to operate. The sensor-based constraint of the policy 110 can be satisfied by a reading from a geolocation on the computing device 100. From these examples set forth above, it can be readily ascertained that there are many situations where it may be desirable to restrict access to the secret data 108 based upon at least one sensor reading output by one or more of the sensors 102-104 on the computing device 100.

The computing device 100 additionally comprises a memory 112 that includes a plurality of instructions and a processor 114 that is configured to execute the instructions in the memory 112. In an example, the processor 114 may support a reduced instruction set, as is common with the many mobile computing devices. For instance, the processor 114 may support a 32 bit instruction set. Other lengths of instruction sets are contemplated, and it can be ascertained that the computing device 100 may optionally be any suitable computing device that can be classified as a reduced instruction set computing device.

The memory 112 includes an operating system 116 that is installed thereon. An application 118 can be executed through utilization of the operating system 116. For example, the application 118 may be a browser, a word processing application, a text messaging application, or any other suitable application that can execute on a computing device that is supported by the operating system 116. While the application 118 is shown as being separate from the operating system 116, as used herein, the term "application" is intended to include functionality that may be supported internally by the operating system 116, such as access to particular computing resources on the computing device 100 (e.g. a disk space, memory locations, . . . ).

The application 118, either autonomously or responsive to receipt of a user action, can indicate that the secret data 108 is desirably sealed with the policy 110. In other words, the application 118 can indicate that it is desirable to protect the confidentiality of the secret data 108 against the policy 110. In an example, the application 118 may be in communication with another computing device (e.g. a network server or collection of servers), and the server can provide the secret data 108 and/or the policy 110 in a cryptographically secure manner to the computing device 100. The application 118 may then request that the data 108 be sealed with the policy 110. Again, the policy 110 can define generally whether the application 118 (or the user of the computing device 100) is authorized to access the secret data 108 and can include at least one sensor-based constraint that can be satisfied by a reading output by at least one of the sensors 102-104.

The memory 112 can additionally comprise a receiver component 120 that receives a request to seal the secret data 108 to the policy 110. Responsive to receiving the request to seal the secret data 108 with the policy 110 from the application 118, the receiver component 120 can receive the secret data 108 and the policy 110 from the data store 106. A sealer component 122, that is in communication with the receiver component 120, can seal the secret data 108 with the policy 110 responsive to the receiver component 120 receiving the request to seal the secret data 108 to the policy 110. In an exemplary embodiment, the output of the sealer component 122 can be ciphertext 127 that is retained in the data store 106. The ciphertext 127, in an exemplary embodiment, can be an encryption of the secret data 108, which is encrypted based at least in part upon the policy 110. Thereafter, the sealer component 122 can cause the data 108 (and optionally the policy 110) to be deleted from the data store 106, while the ciphertext 127 is retained.

Subsequently, the application 118 and/or the user of the computing device 100 may desirably retrieve the secret data 108 (which has been deleted). The memory 112 can additionally comprise a retriever component 124 that receives, from the application 118 and/or the user, a request to unseal the secret data 108 from the policy 110. Responsive to receiving such a request, the retriever component 124 retrieves a sensor reading from at least one of the sensors 102-104 on the computing device 100, wherein the at least one of the sensors 102-104 can output a reading that can satisfy the sensor-based constraint of the policy 110. In an example, the application 118 can specify to the retriever component 124 which of the sensors 102-104 can output a reading that can satisfy the sensor-based constraint.

The memory 112 also comprises an unsealer component 126 that unseals the secret data 108 from the policy 110 and outputs the secret data 108 to the application 118 and/or the user if, and only if, the sensor reading from the at least one of the sensors 102-104 satisfies the sensor-based constraint that is included in the policy 110. In an example, the policy 110 can specify a range of values and the sensor reading output by the at least one of the sensors 102 through 104 may have a value that matches one of the values in the range of values specified in the policy 110. It is to be understood that the unsealer component 126 may consider other factors when choosing whether to provide access to the secret data 108 to the application 118. For instance, a reading from a sensor may be required to be generated within a threshold amount of time from the request to unseal the secret data 108 from the policy 110. The act of unsealing may include decrypting the ciphertext 127 through utilization of at least one of the values output by the sensors 102-104.

In an exemplary embodiment, an algorithm that can be executed by the sealer component 122 can be as follows:

```
CipherText Seal(Data, Policy, P) {
    Generate symmetric key S
    Result = SymmetricEncryption(Data); // using the symmetric key S
    Result += SymmetricEncryption(Policy); // using the symmetric
    key S
    Result += PublicKeyEncryption(S); // using the public key P
    Destroy S, Data,;
    Return Result;
``` where CipherText GeoSeal(Data, Policy, P) is an API call output by the application 118, Data is the secret data 108, Policy is the policy 110, P is a public key, S is a symmetric key, and the returned Result is the ciphertext 127.

Additionally, in another exemplary embodiment the algorithm that can be executed by the unsealer component 126 when unsealing the secret data 108 from the policy 110 can be as follows:

```
Data Unseal(Ciphertext) {
    CurrentReading= ReadTrustworthySource(now);
    S = PrivateKeyDecryption(Result); // decrypt symmetric key using
the private key K
    Policy = SymmetricKeyDecryption(Result); // using the symmetric
    key S
    If CurrentReading does not obey Policy
        Return Error("Current Reading violates Policy"};
    Data = SymmetricKeyDecryption(Result); // using the symmetric
    key S
    Return Data;
``` where Data Unseal(Ciphertext) is an API call output by the application 118, and CurrentReading is a value output by one of the sensors 102-104 (which may be a trusted reading, as described below).

The computing device 100, as shown, includes the operating system 116, the application 118, the receiver component 120, the sealer component 122, the retriever component 124, and the unsealer component 126, together in the memory 112. In another exemplary embodiment, to improve security with respect to the secret data 108, the policy 110 and/or the ciphertext 127, at least the receiver component 120, the sealer component 122, the retriever component 124 and the unsealer component 126 may be separated from the operating system 116 and/or the application 118, logically, physically, or both. For instance, as will be shown and described herein, the aforementioned components 120, 122, 124, and 126 can reside and execute across hardware that is different than what is used to execute the operating system 116 and/or the application 118. For instance, the components 120-126 can reside/ execute in a first core in a system on a chip (SoC) system, while the operations system 116 and application 118 can reside and execute in a second core in such system.

In another exemplary embodiment, the memory 112 can be partitioned logically, such that the operating system 116 and/ or the application 118 have no access to the portions of the memory 112 utilized by the receiver component 120, the sealer component 122, the retriever component 124 and/or the unsealer component 126. This can be effectuated, for example, through utilization of one or more virtual machines. Additionally, to reduce or eliminate the possibility of modification of readings output by one or more of the sensors 102-104, various technologies can be employed to sign sensor readings to verify that the values have been output by the sensors 102-104 and are unmodified. Exemplary techniques for causing sensors to generate trustworthy readings are described in U.S. patent application Ser. No. 12/823,150 filed on Jun. 25, 2010, and entitled, "TRUSTED SENSORS", the entirety of which is incorporated herein by reference.

Figure 2:
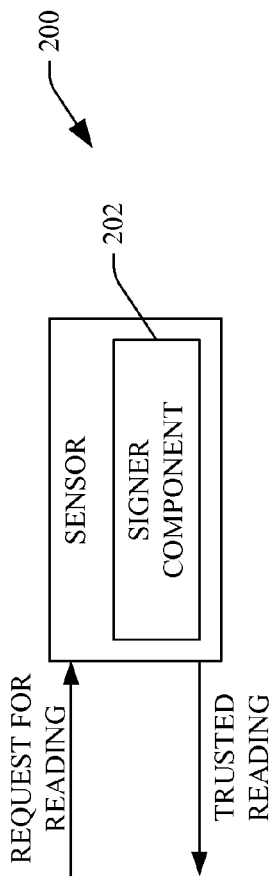
FIG. 2 illustrates a sensor with hardware that generates a signature that indicates that values output by the sensor are authentic.

With reference now to FIG. 2, an exemplary sensor 200 is illustrated. The sensor 200 receives a request for a sensor reading (e.g. from the receiver component 120 and/or the retriever component 124). The sensor 200 includes a signer component 202, which comprises dedicated hardware that generates a signature and assigns such signature to a reading output by the sensor 200 to indicate to a recipient process/ application that the reading is trustworthy. In other words, the signature indicates to the recipient application or process that the value output by the sensor 200 is accurately reflected in the sensor reading and has not been modified by a user or malicious software. In an exemplary embodiment, the sensor 200 may be any one of the sensors 102-104.

Figure 3:
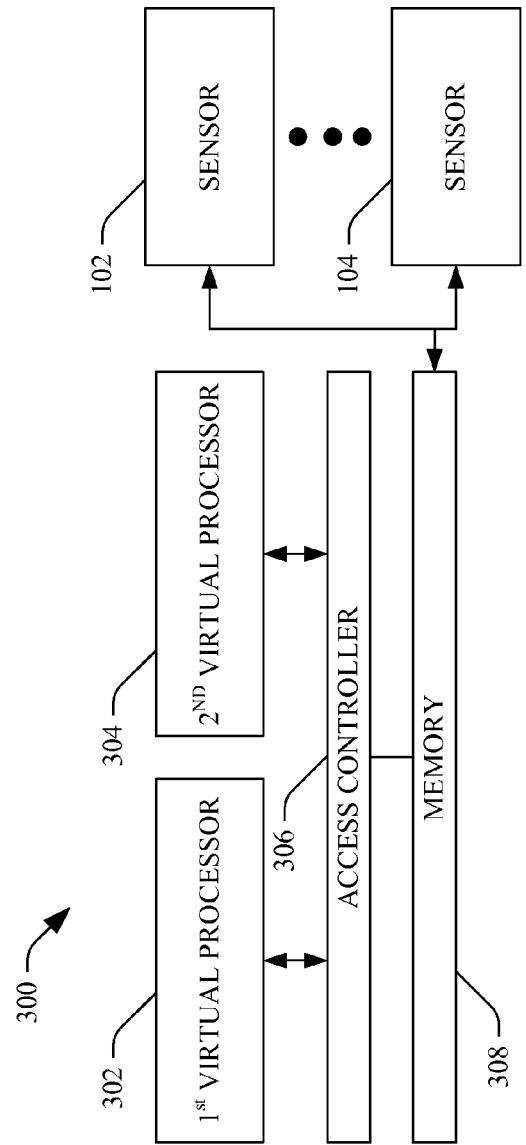
FIG. 3 is a functional block diagram of an exemplary system that is configured to seal and unseal secret data to and from a policy.

With reference now to FIG. 3, an exemplary system 300 that facilitates sealing and unsealing the secret data 108 with and from the policy 110, respectively, is illustrated. In an exemplary embodiment, the system 300 may reside on a system on chip (SOC) configuration but is a low-cost alternative to adding an additional dedicated security core to such system. The system 300 can comprise a first virtual processor 302 and a second virtual processor 304. The first virtual processor 302 and the second virtual processor 304 are backed by a hardware-implemented access controller 306, which allows an application or processor core to switch between two different states, which can be referred to herein as "worlds," to prevent information from leaking from trusted world to an untrusted world. A switch between worlds is generally orthogonal to all other capabilities of a processor. Accordingly, each world can operate independently of the other while using the same core.

The system 300 further comprises a memory 308, which can be a portion of the core that includes the first virtual processor 302 and the second virtual processor 304. The memory 308 and other peripherals can be made aware of the different worlds (an untrusted world and a trusted world) of the core and may use this information to provide access control to the secret data 108 and other code on the system 300.

In an exemplary embodiment, an operating system of the computing device 100 can execute in the first virtual processor 302 in the less secure world, while the receiver component 120, the sealer component 122, the retriever component 124 and the unsealer component 126 can be executed by the second virtual processor 304 in the more secure world. Accordingly, pursuant to an example, I/O devices, such as the sensors 102-104, can be assigned to the more secure world, thereby creating a secure data source (such as a location source). Similarly, the components 120-126 can execute in the more secure world to obtain greater memory protection.

To perform an unseal, code, such as the application 118 or the operating system 116 executing in the less secure world, can make a call to seal or unseal the secret data 108 with or from the policy 110, respectively, to the more secure world. Inside the more secure world, for instance during an unseal operation, the unsealer component 126 can receive a reading from a sensor, compare the reading with contents of the policy 110 specified at the time that the policy was sealed with the data, and continue to decrypt the data if the policy is satisfied. The system 300 can additionally comprise a trusted platform module (not shown), which can include a storage root key (SRK). In an example, the TPM may be a hardware TPM, a software implementation of a TPM that executes in the secure world (e.g., a firmware TPM). Accordingly, the secret data 108 can be sealed with the policy 110 using the SRK of the TPM.

Figure 4:
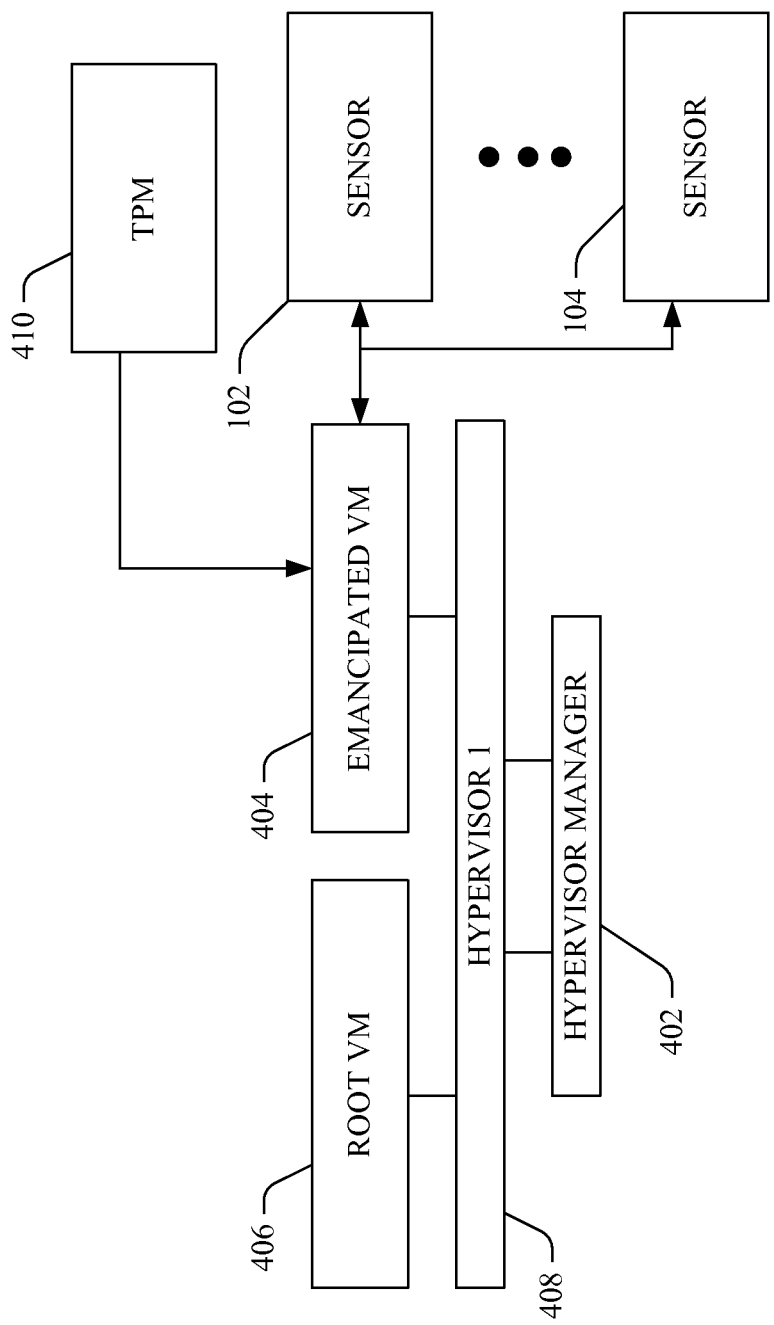
FIG. 4 is a functional block diagram of an exemplary system that facilitates sealing and unsealing secret data to and from a policy in an emancipated virtual machine.

With reference now to FIG. 4, another exemplary system 400 that facilitates securely sealing and unsealing the secret data 108 with and from the policy 110, respectively, is illustrated. The system 400 comprises a hypervisor manager 402. The hypervisor manager 402 refers to a virtualization technology that offers an emancipated virtual machine 404. The emancipated virtual machine 404 is a runtime environment, whose memory region is isolated from the remainder of a computing system including the memory region corresponding to a root virtual machine 406. For instance, the root virtual machine 406 can be charged with executing the operating system 116 and applications that conform thereto.

The system 400 further includes a hypervisor 408 that offers relatively strong memory protection and assigns a source of data (e.g., at least one of the sensors 102-104) securely to the emancipated virtual machine 404. The system 400 can additionally comprise a TPM 410 which can employ remote attestation to attest that the hypervisor 408 with the strong memory protection (configured to enforce security properties) is being run. The emancipated virtual machine 404 can then execute the seal and unseal operations securely as has been described above, and can further obtain trustworthy readings from one or more of the sensors 102-104.

Pursuant to an example, the operating system 116 and/or the application 118 can execute in the root virtual machine 106 and can receive and/or generate the secret data 108 and/or the policy 110. The secret data 108 and the policy 110 may then be passed to the emancipated virtual machine 404, and the sealer component 122 can seal the secret data 108 with the policy 110 using the SRK of the TPM 410. Again, this can result in the generation of ciphertext, which can be provided back to the operating system 116 and/or the application 118 executing in the root virtual machine 406

Subsequently, it may be desirable to unseal the secret data 108 from the policy 110. The unsealer component 126 in the emancipated virtual machine 404 can receive the ciphertext, and the retriever component 124 can retrieve a trustworthy sensor reading from one or more of the sensors 102-104. The unsealer component 126 can further use the SRK of the TPM 410 and can unseal the secret data 108 based at least in part upon the secure sensor reading and the SRK. For instance, the TPM can use the SRK to unseal the secret data 108 from the policy 110 on behalf of the unsealer component 126. The secret data 108 may then be passed back to the application 118 and/or the operating system 116 in the root virtual machine 406.

Figure 5:
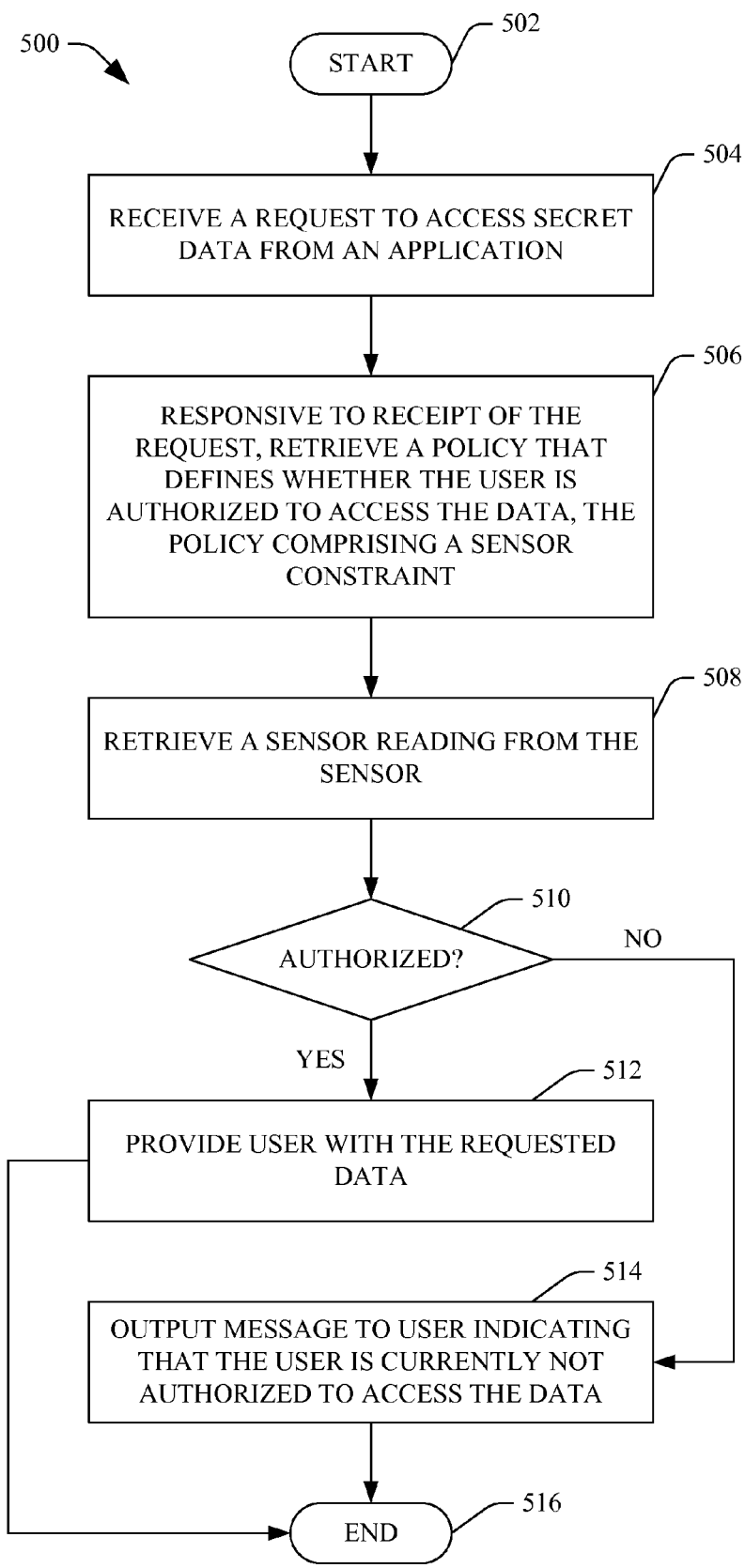
FIG. 5 is a flow diagram that illustrates an exemplary methodology for unsealing data based at least in part upon a reading output by a sensor on a computing device.
Figure 6:
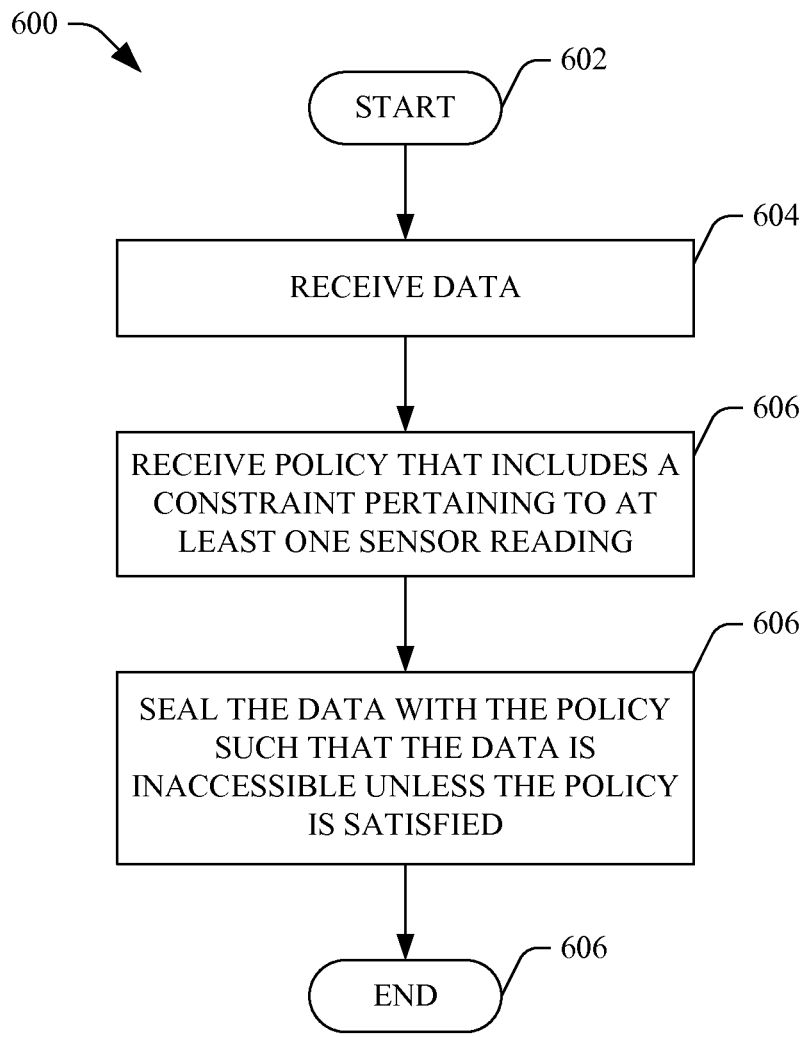
FIG. 6 is a flow diagram that illustrates an exemplary methodology for sealing secret data to a policy.
Figure 7:
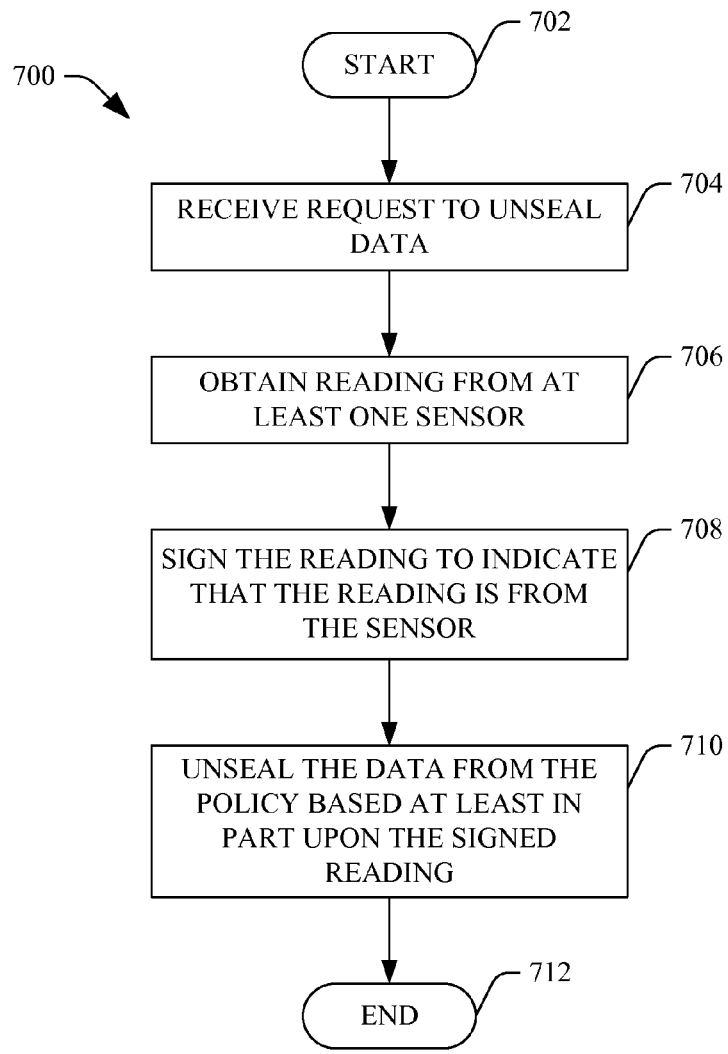
FIG. 7 is a flow diagram that illustrates an exemplary methodology for determining whether or not to unseal data from a policy based at least in part, upon a signed sensor reading.

With reference now to FIGS. 5-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 5, an exemplary methodology 500 that facilitates unsealing secret data from a policy based at least in part upon a reading output by a trustworthy sensor is illustrated. The methodology 500 begins at 502, and at 504 a request to access secret data is received from an application executing on a computer.

At 506, responsive to receipt of the request, a policy is retrieved that defines whether the user and/or application is authorized to access the secret data. The policy includes a constraint that can only be satisfied by a reading from a sensor on the computer. In an exemplary implementation, the policy can be encrypted through utilization of a secret key and may be securely unencrypted responsive to receipt of the request to access the secret data.

At 508, a sensor reading is retrieved from the at least one sensor on the mobile computing device of the user. As described above, the sensor reading may be trustworthy, in that such reading can be signed to indicate that the sensor reading is unmodified by a user or malicious software. In an example, the sensor reading may be a location from a geolocation sensor.

At 510, a determination is made regarding whether the application is authorized to access the secret data. This determination can be made by comparing the sensor-based constraint with the sensor reading output from the at least one sensor. In an example, determination can be made based at least in part upon a comparison between a geographic range specified in the policy and a geographic location output by a geolocation sensor.

If it is determined at 510 that the application is authorized to access the data, then at 512 the application is provided with the secret data. If it is determined at 510 that the application is not authorized to access the secret data, then at 514 a message can be output to the user indicating that the application is currently not authorized to access the secret data. The methodology 500 completes at 516.

Turning now to FIG. 6, an exemplary methodology 600 that facilitates sealing secret data with a policy is illustrated. The methodology 600 starts at 602, and at 604 secret data is received. For example, the secret data may be user-generated secret data, such as a password. In another exemplary embodiment, the secret data may be a cryptographic key generated through any suitable cryptographic technique.

At 606, a policy is received that includes a constraint pertaining to at least one sensor reading. At 608, the data is sealed with the policy, such that the secret data is inaccessible to an application unless the constraint pertaining to the at least one sensor reading is satisfied. The methodology 600 completes at 608.

Turning now to FIG. 7, an exemplary methodology 700 that facilitates unsealing secret data from a policy is illustrated. The methodology 700 starts at 702, and at 704 a request to unseal secret data is received from a computer executable application. At 706, a reading is obtained from at least one sensor on a mobile computing device. At 708, the reading is signed to indicate that the reading is accurate (that the reading output by the sensor has not been modified by a user or malicious software).

At 710, the data is unsealed from the policy based, at least in part upon the signed reading from the sensor. The methodology 700 completes at 712.

Figure 8:
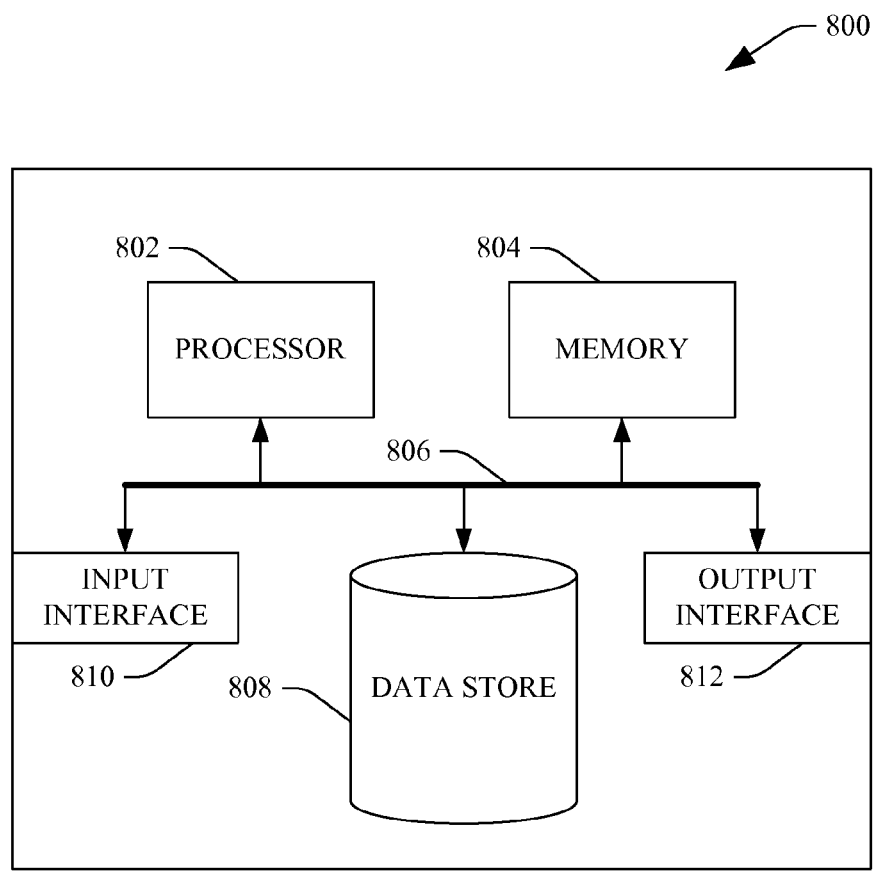
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports sealing secret data with a policy. In another example, at least a portion of the computing device 800 may be used in a system that supports unsealing secret data from a policy. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store cryptographic keys, policies, readings output by sensors, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, policies, ciphertext, reading from sensors, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed at a mobile computing device, the method comprising:
   at a processor on a mobile computing device:
   receiving, from an application executing on the mobile computing device, a request to access secret data retained on computer-readable storage of the mobile computing device;
   responsive to receiving the request, retrieving an encrypted policy from the computer-readable storage on the mobile computing device and decrypting the encrypted policy, the policy comprising a sensor-based constraint, the sensor-based constraint tied to a sensor on the mobile computing device, the policy defines a value from the sensor that satisfies the sensor-based constraint;
   responsive to retrieving and decrypting the encrypted policy, requesting a sensor reading from the sensor on the mobile computing device;
   receiving the sensor reading;
   determining whether the policy is satisfied based upon a comparison between the value defined in the policy and the sensor reading from the sensor; and
   when and only when the policy is satisfied, providing the application with the secret data.

2. The method of claim 1, wherein the sensor is a global positioning system sensor.

3. The method of claim 1, wherein the sensor is one of a thermometer, an accelerometer, a velocity sensor, a proximity sensor, or a gyroscope.

4. The method of claim 1, wherein the policy defines that the secret data is inaccessible to any device other than the mobile computing device.

5. The method of claim 1, further comprising:
   receiving a request to generate the policy;
   generating the policy responsive to receipt of the request; and
   sealing the secret data with the policy responsive to receipt of the request, such that the application is unable to access the secret data unless the policy is satisfied by the sensor reading.

6. The method of claim 5, wherein the generating of the policy and the sealing of the secret data with the policy is undertaken on the mobile computing device.

7. The method of claim 5, wherein the generating of the policy and the sealing of the secret data with the policy is undertaken on a server that is in communication with the mobile computing device.

8. The method of claim 1, wherein the mobile computing device is one of a portable telephone, a tablet, a netbook, or a laptop, and the at least one sensor is a global positioning system sensor.

9. The method of claim 1, the application being a text messaging application, the secret data being a key, wherein the application is configured to send and receive text messages responsive to receipt of the key.

10. The method of claim 1, wherein the secret data is encrypted, the method further comprising decrypting the secret data when and only when the policy is satisfied, wherein decrypting the secret data is undertaken in a hardware trusted platform module.

11. The method of claim 1, further comprising:
    executing the application on a first core of the processor; and
    determining that the policy is satisfied on a second core of the processor.

12. A computing device, comprising:
    a processor; and
    computer-readable storage that stores instructions that, when executed by the processor, cause the processor to perform acts comprising:
    receiving, from an application executing on the computing device, a request to unseal secret data from a policy, the policy encrypted and stored in the computer-readable storage, the policy comprises a sensor-based constraint that is tied to a sensor on the computing device, the policy defining a sensor value that satisfies the sensor-based constraint, the sensor-based constraint satisfiable only by data output by the sensor;
    responsive to receiving the request, decrypting the policy;
    responsive to decrypting the policy, identifying the sensor that is tied to the sensor-based constraint;
    responsive to identifying the sensor, retrieving a sensor reading from the sensor; and
    unsealing the secret data from the policy and outputting the secret data to the application when and only when the sensor reading from the sensor corresponds to the sensor value and satisfies the sensor-based constraint.

13. The computing device of claim 12, the secret data being a password.

14. The computing device of claim 12, the acts further comprising:
    receiving the policy from the application;
    receiving the secret data;
    receiving a request to seal the secret data with the policy; and
    sealing the secret data with the policy responsive to receiving the request to seal the secret data with the policy, wherein sealing the secret data with the policy comprises:
    encrypting the policy and storing the encrypted policy in the computer-readable storage; and encrypting the secret data and storing the encrypted secret data in the computer-readable storage.

15. The computing device of claim 12, the processor being a hardware trusted platform module.

16. The computing device of claim 12 comprising a first virtual machine and a second virtual machine, wherein the application executes in the second virtual machine and the acts are performed in the first virtual machine.

17. The computing device of claim 12, the application being a text messaging application, the secret data being a key, wherein the application is configured to send and receive text messages responsive to receipt of the key.

18. The computing device of claim 12, the policy identifies the sensor of the sensor-based constraint.

19. A computer-readable medium comprising instructions that, when executed by a processor, cause the processor to perform acts comprising:

receiving a request to transmit a text message by way of a text messaging application installed on a mobile computing device;

responsive to receiving the request, retrieving a policy retained in computer-readable storage on the mobile computing device, the policy defines whether transmittal of text messages is authorized, the policy comprising a sensor-based constraint that is tied to a sensor on the mobile computing device, the policy defines a value that satisfies the sensor-based constraint;

retrieving a sensor reading from the sensor on the mobile computing device;

determining whether the sensor-based constraint has been satisfied based upon a comparison between the value defined in the policy and the sensor reading from the sensor; and when and only when the sensor-based constraint is satisfied, transmitting the text message.

20. The computer-readable medium of claim 19, wherein a hardware trusted platform module performs at least determining whether the sensor-based constraint has been satisfied based at least in part upon a comparison between the value defined in the policy and the sensor reading from the sensor.

* * * * *